(12) United States Patent
Abdalla et al.

(10) Patent No.: US 11,905,917 B2
(45) Date of Patent: Feb. 20, 2024

(54) FUEL-WATER SEPARATOR FILTER ASSEMBLY WITH AXIAL SEALING MEMBER

(71) Applicant: Cummins Filtration Inc., Nashville, TN (US)

(72) Inventors: Wassem Abdalla, Fishers, IN (US); Nikhil Manohar Kalbande, Cookeville, TN (US); Vaibhav Pimpalte, Pune (IN)

(73) Assignee: CUMMINS FILTRATION INC., Nashville, TN (US)

( * ) Notice: Subject to any disclaimer, the term of this patent is extended or adjusted under 35 U.S.C. 154(b) by 176 days.

(21) Appl. No.: 17/486,304

(22) Filed: Sep. 27, 2021

(65) Prior Publication Data

US 2022/0099058 A1 Mar. 31, 2022

(30) Foreign Application Priority Data

Sep. 29, 2020 (IN) .............................. 202041042334

(51) Int. Cl.
*F02M 37/34* (2019.01)
*F02M 37/24* (2019.01)
*B01D 35/30* (2006.01)

(52) U.S. Cl.
CPC ........... *F02M 37/34* (2019.01); *B01D 35/306* (2013.01); *F02M 37/24* (2019.01); *B01D 2201/291* (2013.01)

(58) Field of Classification Search
CPC ...... F02M 37/34; F02M 37/24; B01D 35/306; B01D 2201/291; B01D 2201/0415; B01D 2201/34; B01D 36/003; B01D 27/08
USPC ....... 210/450, 493.2, DIG. 5, 315, 338, 342, 210/442, 446, 455, 248
See application file for complete search history.

(56) References Cited

U.S. PATENT DOCUMENTS

| | | | |
|---|---|---|---|
| 4,502,955 A | 3/1985 | Schaupp | |
| 5,904,844 A | 5/1999 | Stone | |
| 9,546,626 B2 | 1/2017 | Laforge | |
| 10,252,193 B2 | 4/2019 | Rolle et al. | |
| 2008/0047132 A1* | 2/2008 | Wieczorek | B01D 35/153 210/248 |
| 2016/0082368 A1 | 3/2016 | Morris et al. | |
| 2016/0082369 A1* | 3/2016 | Morris | B01D 35/005 210/442 |
| 2019/0151780 A1* | 5/2019 | Piva | B01D 35/147 |

(Continued)

FOREIGN PATENT DOCUMENTS

| | | |
|---|---|---|
| CA | 1292953 | 12/1991 |
| WO | WO-2019/173736 | 9/2019 |

(Continued)

*Primary Examiner* — Madeline Gonzalez
(74) *Attorney, Agent, or Firm* — Foley & Lardner LLP

(57) ABSTRACT

A filter assembly comprises a housing defining an internal volume. An opening is defined at a bottom end of the housing. An adaptor is coupled to the bottom end of the housing. A filter element is disposed within the housing. The filter element comprises a filter media defining a central channel, and an endcap coupled to a filter media bottom end of the filter media proximate to the adaptor. A sealing member is disposed around the adaptor, the sealing member configured to form an axial seal between the endcap and the housing.

20 Claims, 3 Drawing Sheets

(56) References Cited

U.S. PATENT DOCUMENTS

2020/0368653 A1  11/2020  Thakare et al.
2021/0283539 A1   9/2021  Pokharkar et al.

FOREIGN PATENT DOCUMENTS

WO  WO-2020/185572   9/2020
WO  WO-2021/257827  12/2021

* cited by examiner

FUEL-WATER SEPARATOR FILTER ASSEMBLY WITH AXIAL SEALING MEMBER

CROSS-REFERENCE TO RELATED APPLICATIONS

The present application claims priority to and benefit of Indian Provisional Application No. 202041042334, filed Sep. 29, 2020, the entire disclosure of which is incorporated herein by reference.

TECHNICAL FIELD

The present disclosure relates generally to filtration systems for filtering fluids such as fuel.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.), and in some instances, also separate water from the fuel. Such fuel-water separator filter assemblies generally separate water at an outer diameter of the filter element, and the separated water accumulates in a water reservoir located below the filter element. In some instances, the unfiltered fuel or separated water may leak from a dirty side of the filter element to the clean side of the filter element at locations where a housing of the filter assembly is coupled to the water reservoir.

SUMMARY

Embodiments described herein relate generally to fuel-water separator filter assemblies and in particular, to filter assemblies that include a sealing member disposed around an adaptor of the filter assembly, which forms an axial seal with an endplate of a filter element of the filter assembly and the housing or shell of the filter assembly.

In some embodiments, a filter assembly comprises a housing defining an internal volume. An opening is defined at a bottom end of the housing. An adaptor is coupled to the bottom end of the housing. A filter element is disposed within the housing. The filter element comprises a filter media defining a central channel, and an endcap coupled to a filter media bottom end of the filter media proximate to the adaptor. A sealing member is disposed around the adaptor, the sealing member configured to form an axial seal between the endcap and the housing.

In some embodiments, a housing assembly for a filter element comprises a housing defining an internal volume for receiving a filter element that comprises a filer media defining a central channel and an endcap coupled to a filter media bottom end of the filter media, an opening defined at a bottom end of the housing. An adaptor is coupled to the bottom end of the housing, and a sealing member is disposed around the adaptor. The sealing member is configured to form an axial seal with the endcap and the housing when the filter element is disposed in the housing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
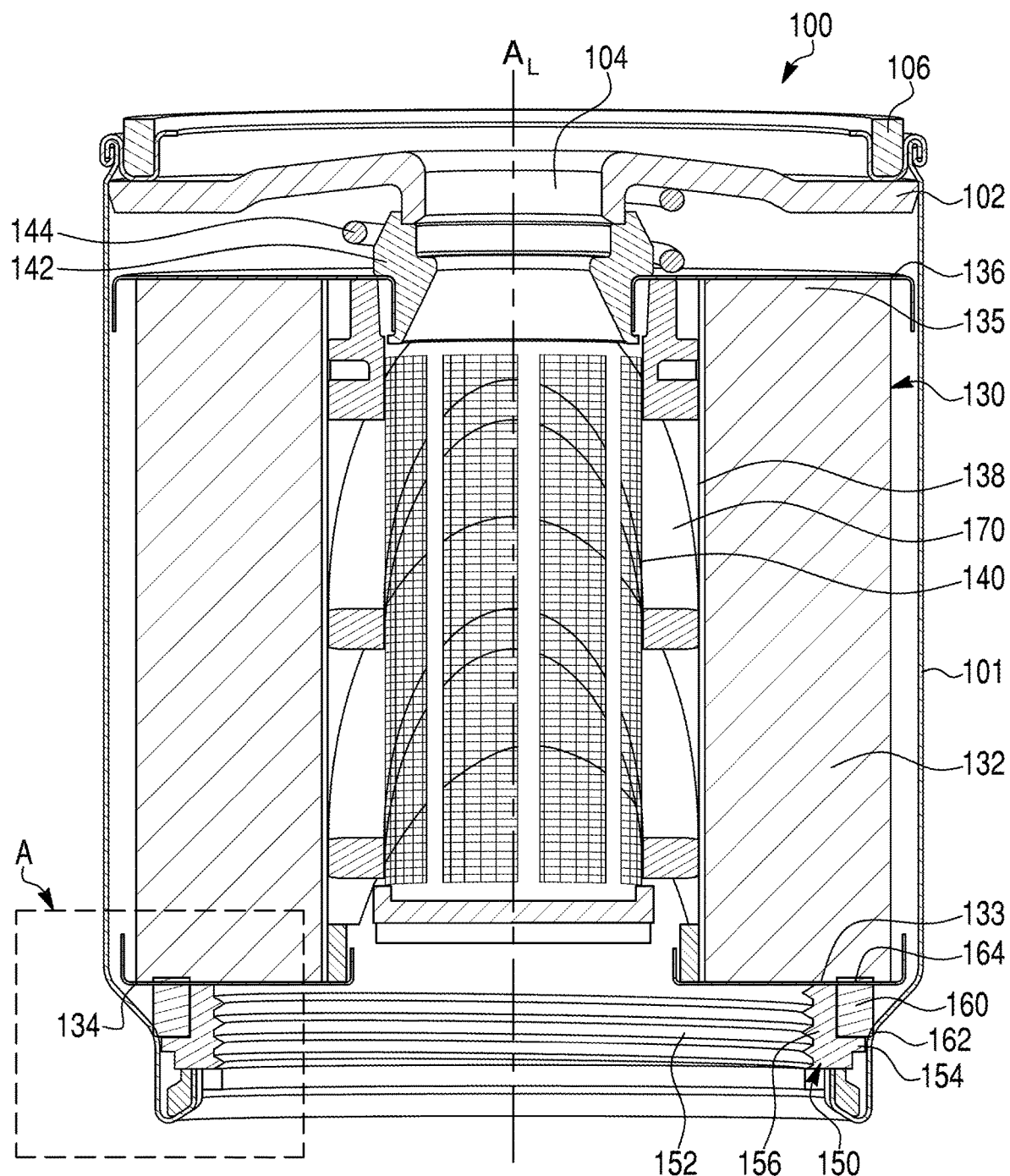
FIG. 1 is a side cross-section view of a filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to fuel-water separator filter assemblies and in particular, to filter assemblies that include a sealing member disposed around an adaptor of the filter assembly, which forms an axial seal with an endplate of a filter element of the filter assembly and the housing or shell of the filter assembly.

Embodiments of the filter assembly described herein may provide various benefits including, for example: (1) preventing fluid from leaking from a dirty side to a clean side of a filter element; (2) allowing a sealing member to form a seal between a filter element and a housing without mounting the sealing member on either of filter element or the housing; (3) pushing the filter element against the sealing member to provide enhanced sealing; and (4) simplifying sealing member design, thereby reducing manufacturing complexity, facilitate installation, and reduce manufacturing and installation cost.

FIG. 1 is a side cross-section view of a fuel-water separator filter assembly ("hereinafter "filter assembly 100"), according to an embodiment. The filter assembly 100 includes a housing 101, a filter element 130, an adaptor 150, and a sealing member 160 positioned around the adaptor 150.

The housing 101 defines an internal volume within which the filter element 130 is disposed along a longitudinal axis $A_L$ of the housing 101. A nutplate 102 is coupled to a top end of the housing 101. The nutplate 102 defines a central opening 104 which may serve as an outlet for filtered fuel to exit the housing 101. Apertures (not shown) may also be defined in the nutplate 102 around the central opening 104 for communicating unfiltered fuel into the housing 101 around the filter element 130. The central opening 104 may be configured to receive an inlet conduit of a filter head (not shown). A filter head sealing member 106 (e.g., an O-ring or gasket) is disposed at the top end of the housing 101 and configured to form an axial and/or radial seal with the filter head when the filter assembly 100 is coupled to the filter head.

An adaptor 150 is coupled to a bottom end of the housing 101 opposite the top end. The adaptor 150 may include a ring shaped structure including a plurality of threads 152 defined on a radially inner surface thereof. The plurality of threads 152 are configured to mate with corresponding threads of a water reservoir (not shown) to allow the water reservoir to be coupled to the bottom end of the housing 101 via the adaptor 150. Water separated from the fuel after passing through the filter element 130 passes through the adaptor 150 into the water reservoir and may be collected in the water reservoir to be later drained.

The filter element 130 is disposed in the internal volume defined by the housing 101. The filter element 130 includes a filter media 132 defining a central channel within which a center tube 170 is disposed. The filter element 130 is a radial flow filter element configured to filter the fuel as the fuel flows in a radial direction from an outer radial surface of the filter media 132 and through the filter media 132 into the central channel as filtered fuel, for example, via a plurality of openings defined in the center tube 170.

Figure 4:
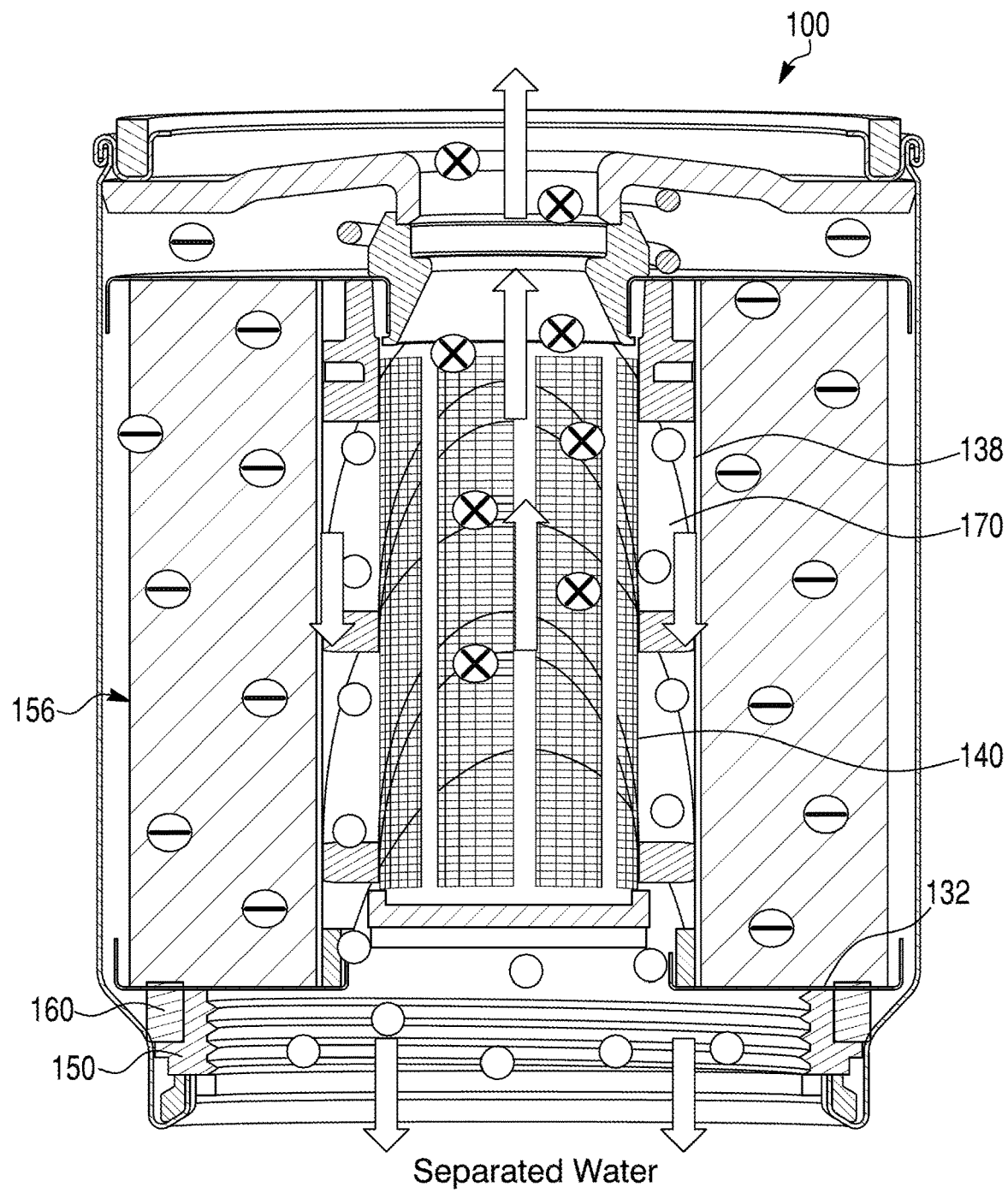
FIG. 4 is another side cross-section view of the filter assembly of FIG. 1 showing the paths of various fluids through the filter assembly.

As shown in FIG. 4, the filter media 132 is additionally configured to coalesce water that may be present in the fuel as the fuel flows radially from outside the filter media 132 through the filter media 132 towards the central channel. A coalescing tube 138 may be disposed within the central channel between the filter media 132 and the center tube 170. The coalescing tube 138 further coalesces water droplets so as to make the water droplets larger and heavier. Moreover, a hydrophobic layer 140 or any other water separation layer is coupled to the center tube 170 (e.g., an inner surface of the center tube 170). The hydrophobic layer 140 separates or strips the coalesced water droplets from the clean fuel that has passed through the filter media 132. The clean fuel flows through the central channel and is communicated to the filter head via the central opening 104 defined in the nutplate 102. The separated water flows downwards under the influence of gravity towards the bottom end of the housing 101 and through the adaptor 150 into the water reservoir.

The filter element 130 further includes a first endcap 134 coupled to a filter media bottom end 133 of the filter media 132 that is proximate to the adaptor 150. A second endcap 136 is coupled to a filter media top end 135 proximate to the nutplate 102 and opposite the filter media bottom end 133. As shown in FIG. 1, leakage may occur between the first endcap 134 and the adaptor 150 that may cause unfiltered fuel to flow from the dirty side of the filter media 132 located between the housing 101 and an outer radial surface of the filter media 132, to the clean side of the filter media 132 located in the central channel of the filter media 132 without flowing through the filter media 132. Such leakage may also prevent coalesced water from being forced towards the hydrophobic layer 140 to allow separation of the coalesced water from the fuel.

Figure 2:
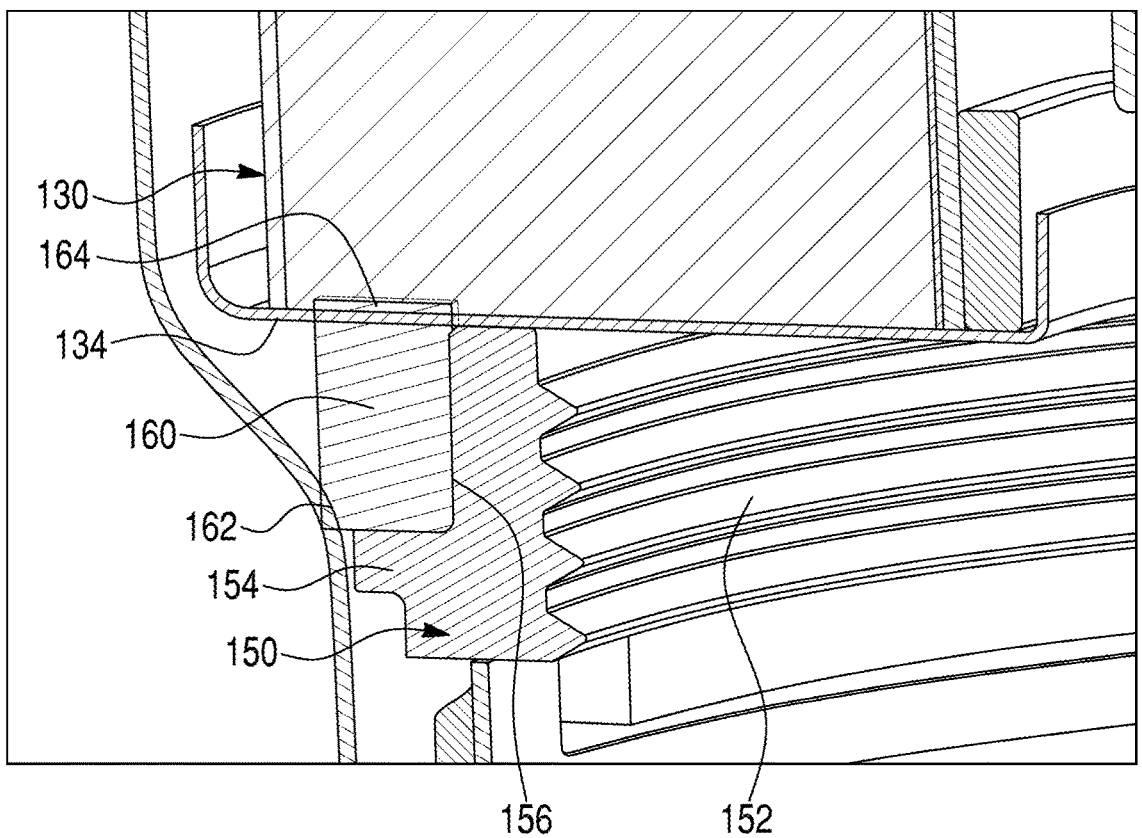
FIG. 2 is a side cross-section view of a portion of the filter assembly of FIG. 1 indicated by the arrow A in FIG. 1.
Figure 3:
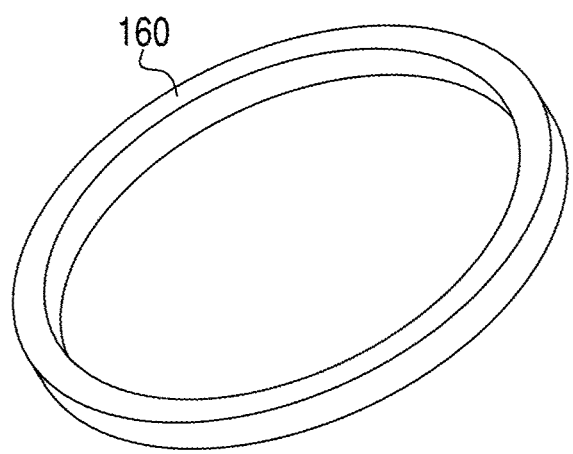
FIG. 3 is a top perspective view of a sealing member included in the filter assembly of FIG. 1, according to an embodiment.

The sealing member 160 is disposed around the adaptor 150 and forms an axial seal with the first endcap 134 and the housing 101. As shown in FIGS. 2 and 3, the sealing member 160 may include a gasket having a rectangular cross-section. In other embodiments, the sealing member 160 may include an O-ring or have an asymmetric or irregular shape. Expanding further, the adaptor 150 may include a ledge 154 extending radially outwards from an outer surface of the adaptor 150. The ledge 154 in combination with a portion of the outer surface 156 of the adaptor 150 may serve as an alignment feature for the sealing member 160. The sealing member 160 may have a width that is larger than a length of the ledge 154 such that a portion of the sealing member 160 protrudes outwards of the ledge 154 so as to form a seal against the housing 101. This may cause an edge 162 of the sealing member 160 to contact an inner surface of the housing 101 such that the sealing member 160 forms an axial and/or radial seal with the housing 101, and the sealing member 160 is also pushed towards an outer surface 156 of the adaptor 150 around which the sealing member 160 is disposed. In particular embodiments, the sealing member 160 forms an axial seal with the housing 101.

A sealing member top surface 164 that is proximate to the first endcap 134 abuts the first endcap 134 to from an axial seal therewith. In this manner, the sealing member 160 forms a seal between the housing 101 and the filter element 130 without being disposed in or being held by either the housing 101 or the filter element 130. Alignment and positioning of the sealing member 160 is achieved instead by the adaptor 150. Moreover, the sealing member 160 can have a simple design that facilitates manufacturability and reduces manufacturing and installation costs.

The second endcap 136 is disposed proximate to the nutplate 102. A second sealing member 142 is disposed between the second endcap 136 and the nutplate 102 and provides a seal between the central channel of the filter element 130 and the central opening 104 of the nutplate 102. For example, a first portion of the second sealing member 142 may be disposed within an inner rim of an aperture defined in the second endcap 136 that is co-axial with the central channel of the filter media 132. A second portion of the second sealing member 142 surrounds the central opening 104 of the nutplate such that second sealing member 142 forms a conduit coupling the central channel with the central opening 104 as well as forms a seal therebetween.

A biasing member 144 (e.g., a helical spring, a Belleville spring, a coiled spring, etc.) is operatively coupled to the second endcap 136. For example, the biasing member 144 may be disposed between the nutplate 102 and the second endcap 136 and may be disposed around the second sealing member 142. The biasing member 144 applies a biasing force on the second endcap 136 urging the filter element 130 towards the sealing member 160 so as to cause the first endcap 134 to push against the sealing member 160. Moreover, the biasing force also pushes the sealing member 160 towards the housing 101, which enhances the seal between the housing 101 and the first endcap 134 via the sealing member 160.

As used herein, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
a housing defining an internal volume, an opening defined at a bottom end of the housing;
an adaptor coupled to the bottom end of the housing;
a filter element disposed within the housing, the filter element comprising:
a filter media defining a central channel, and
an endcap coupled to a filter media bottom end of the filter media proximate to the adaptor; and
a sealing member disposed around the adaptor, the sealing member configured to form an axial seal with the endcap and the housing, the sealing member including a sealing member surface abutting the endcap, thereby forming an axial seal with the endcap.

2. The filter assembly of claim 1, wherein:
the endcap is a first endcap, and
the filter element further comprises a second endcap coupled to a filter media top end of the filter media opposite the filter media bottom end.

3. The filter assembly of claim 2, further comprising:
a biasing member operatively coupled to the second endcap, the biasing member urging the filter element towards the sealing member so as to cause the first endcap to push against the sealing member.

4. The filter assembly of claim 1, wherein the adaptor has a ring shape.

5. The filter assembly of claim 4, wherein the adaptor comprises a plurality of threads defined on a radial inner surface thereof, the plurality of threads configured to mate with corresponding threads of a water reservoir.

6. The filter assembly of claim 1, wherein the sealing member comprises a gasket having a rectangular cross-section.

7. The filter assembly of claim 1, wherein the adaptor comprises a ledge extending radially outward from an outer surface of the adaptor, the ledge in combination with a portion of the outer surface of the adaptor configured to provide an alignment feature for the sealing member.

8. The filter assembly of claim 7, wherein the sealing member has a width that is larger than a length of the ledge such that a portion of the sealing member protrudes outwardly from the ledge.

9. The filter assembly of claim 8, wherein an outer edge of the sealing member distal from the filter media contacts an inner surface of the housing so as to form the axial seal therewith.

10. The filter assembly of claim 1, further comprising a nutplate coupled to a top end of the housing, the nutplate defining a central opening to allow fluid to flow therethrough.

11. The filter assembly of claim 1, further comprising:
a center tube disposed within the central channel; and
a hydrophobic layer coupled to the center tube.

12. The filter assembly of claim 11, further comprising a coalescing tube disposed within the central channel.

13. A filter assembly comprising:
a housing defining an internal volume, an opening defined at a bottom end of the housing;
an adaptor coupled to the bottom end of the housing;
a filter element disposed within the housing, the filter element comprising:
a filter media defining a central channel, and
an endcap coupled to a filter media bottom end of the filter media proximate to the adaptor;
a sealing member disposed around the adaptor, the sealing member configured to form an axial seal with the endcap and the housing;
a nutplate coupled to a top end of the housing, the nutplate defining a central opening to allow fluid to flow therethrough; and
a second sealing member disposed between the second endcap and the nutplate, the second sealing member providing a seal between the central channel of the filter element and the central opening of the nutplate.

14. The filter assembly of claim 13, wherein:
a first portion of the second sealing member is disposed within an inner rim of an aperture defined in the second endcap that is co-axial with the central channel of the filter media, and
a second portion of the second sealing member surrounds the central opening of the nutplate such that the second sealing member forms a conduit coupling the central channel with the central opening.

15. A housing assembly for a filter element, comprising:
a housing defining an internal volume for receiving a filter element that comprises a filter media defining a central channel and an endcap coupled to a filter media bottom end of the filter media, an opening defined at a bottom end of the housing;
an adaptor coupled to the bottom end of the housing; and a sealing member disposed around the adaptor, the sealing member configured to form an axial seal with the endcap and the housing when the filter element is disposed in the housing, the sealing member including a sealing member surface configured to abut the endcap, thereby forming an axial seal with the endcap.

16. The housing assembly of claim 15, wherein the adaptor has a ring shape.

17. The housing assembly of claim 16, wherein the adaptor comprises a plurality of threads defined on a radial inner surface thereof, the plurality of threads configured to mate with corresponding threads of a water reservoir.

18. The housing assembly of claim 16, wherein the adaptor comprises a ledge extending radially outward from an outer surface of the adaptor, the ledge in combination with a portion of the outer surface of the adaptor configured to provide an alignment feature for the sealing member.

19. The housing assembly of claim 18, wherein the sealing member has a width that is larger than a length of the ledge such that a portion of the sealing member protrudes outwardly from the ledge.

20. The housing assembly of claim 19, wherein an outer edge of the sealing member distal from the outer surface of the adaptor contacts an inner surface of the housing so as to form the axial seal therewith.

\* \* \* \* \*